July 11, 1967  R. E. O'BRIEN ET AL  3,329,995
SHEET FORMING AND POST-FORMING TRIM METHOD AND APPARATUS
Filed July 15, 1965  5 Sheets-Sheet 1

INVENTORS
ROBERT E. O'BRIEN
EDWARD C. MARKOWSKI
DIETRICH K. ROTH.

ATTORNEYS

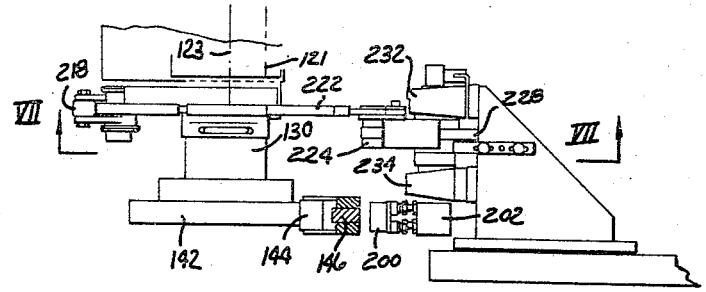
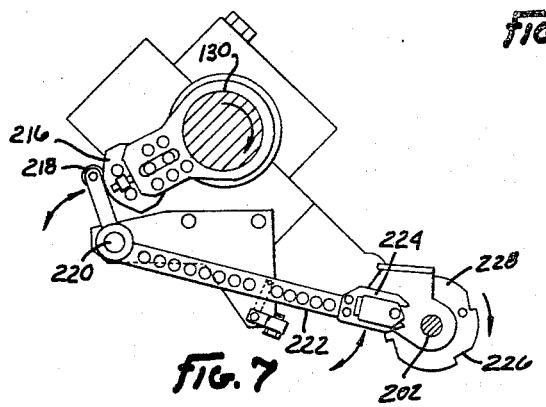
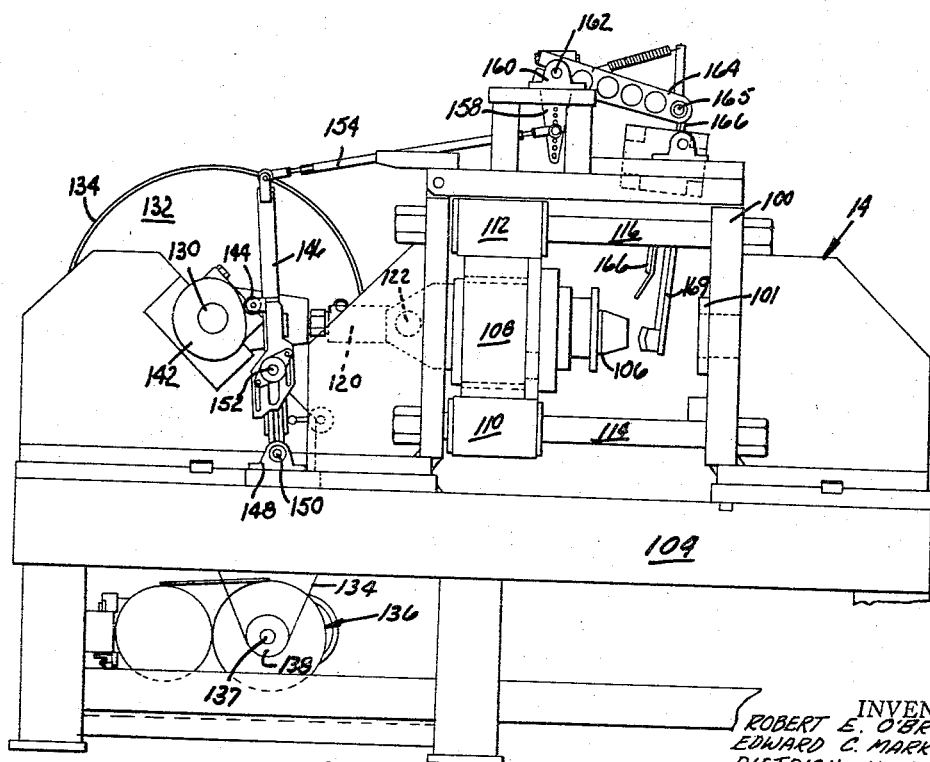

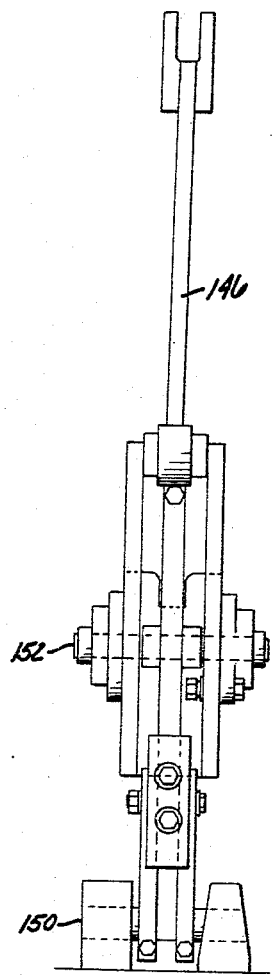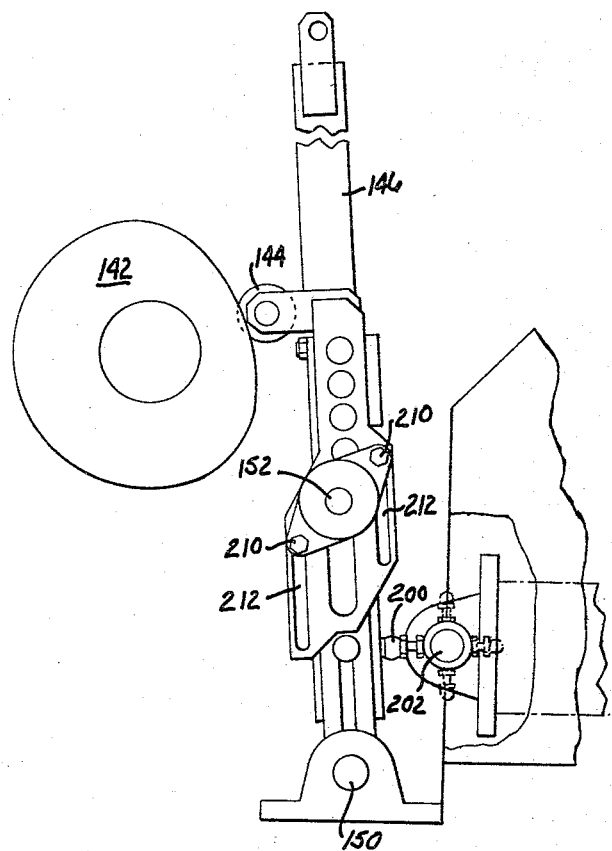
Fig. 5
Fig. 4
INVENTORS
ROBERT E. O'BRIEN
EDWARD C. MARKOWSKI
BY DIETRICH K. ROTH
ATTORNEYS July 11, 1967   R. E. O'BRIEN ET AL   3,329,995
SHEET FORMING AND POST-FORMING TRIM METHOD AND APPARATUS
Filed July 15, 1965   5 Sheets-Sheet 5

INVENTORS
ROBERT E. O'BRIEN
EDWARD C. MARKOWSKI
BY DIETRICH K. ROTH

ATTORNEYS

United States Patent Office 3,329,995
Patented July 11, 1967

3,329,995
SHEET FORMING AND POST-FORMING TRIM METHOD AND APPARATUS
Robert E. O'Brien, Dietrich K. Roth, and Edward C. Markowski, Grand Rapids, Mich., assignors to Kirkhof Manufacturing Corporation, Grand Rapids, Mich., a corporation of Michigan
Filed July 15, 1965, Ser. No. 472,135
6 Claims. (Cl. 18—4)

This invention relates to apparatus for forming, advancing and severing three dimensional articles from a generally continuous web of plastically deformable material, and especially relates to web advancing and control means for and between forming and trim presses.

In apparatus for pressure forming three dimensional objects from a generally continuous web on a mass production basis, particularly a thermoplastic web, the articles are often formed into the web by physical and/or pneumatic pressure differential techniques in a reciprocating forming press, then subsequently severed from the web in a separate trim press. When forming the articles in the forming press, maximum efficiency is achieved by employing dies having a pattern of a plurality of like adjacent die faces to form a plurality of like articles with each press stroke. Sometimes the patterns, each composed of a plurality of articles, are spaced from each other in the web by an intermediate web portion. This spacing of patterns occurs, for example, in webs that travel through a preheat oven prior to entering the forming press. This is because it has been found advisable to condition the portion of the web that is between the forming dies and the oven exit to prevent the web from distorting longitudinally through this portion. This can be done by blowing cold air on this section or by gripping it as explained more fully in copending patent application entitled Sheet Preheating and Forming Method and Apparatus, Ser. No. 474,035, filed July 22, 1965 and assigned to the assignee herein.

This spacing of the patterns of pluralities of articles creates a problem with web advancement in the trim press which must operate on each article. The advancing means normally advances the web uniform amounts equal to the width of each article. The last article in a pattern and the first article in the next pattern, however, are spaced a greater amount because of the web section between the patterns, as mentioned above.

Another difficulty occurring with web advancement from the forming press to the trim press is due to the fact that the web in the forming press is intermittently advanced each time an amount equal to the width of the pattern of several articles plus the space between the patterns, while the trim press is advanced only one article at a time. Yet, the web between the presses cannot get too taut or it will break, and cannot get too loose or its slack will drag on the floor, get tangled in the equipment, etc.

It is an object of this invention to provide web advancing and control apparatus for forming and trimming equipment of plastically deformable web material, achieving controlled correlated relationship between the article forming press and the article severing trim press.

Another object of this invention is to provide variable spaced web advancing means and correlated control means between the forming press and the trim press of pressure forming equipment for plastic web material, preventing excess web slackness and excess web tightness, and always automatically maintaining a controlled zone of tightness in the web between the presses, even though the presses tend to advance the web at different rates.

Another object of this invention is to provide a web advancing means for article trim press units, causing controlled feed of articles in repeat spaced patterns of pluralities of articles, to do so one article at a time, even when the spaces between the patterns are encountered. The advancing means in the trim press normally repeatedly shifts the web a width equal to one article, and uniquely automatically shifts the web an extra amount, periodically, to cover the space between the patterns of articles.

Another object of this invention is to provide an improved plastic article forming, advancing and trimming apparatus for forming and severing three dimensional plastic articles from a generally continuous thermoplastic web.

These and several other objects of this invention will become apparent upon studying the following specification in conjunction with the drawings in which:

FIG. 2 is a side elevational view of the trim press forming part of the apparatus in FIG. 1;

FIG. 4 is a side elevational view of the web advancing lever means in FIG. 3;

FIG. 5 is a rear elevational view of the apparatus in FIG. 4;

FIG. 6 is a top plan view of the apparatus in FIG. 4;

FIG. 7 is a sectional view of the apparatus in FIG. 6, taken on plane VII—VII;

Figure 1:
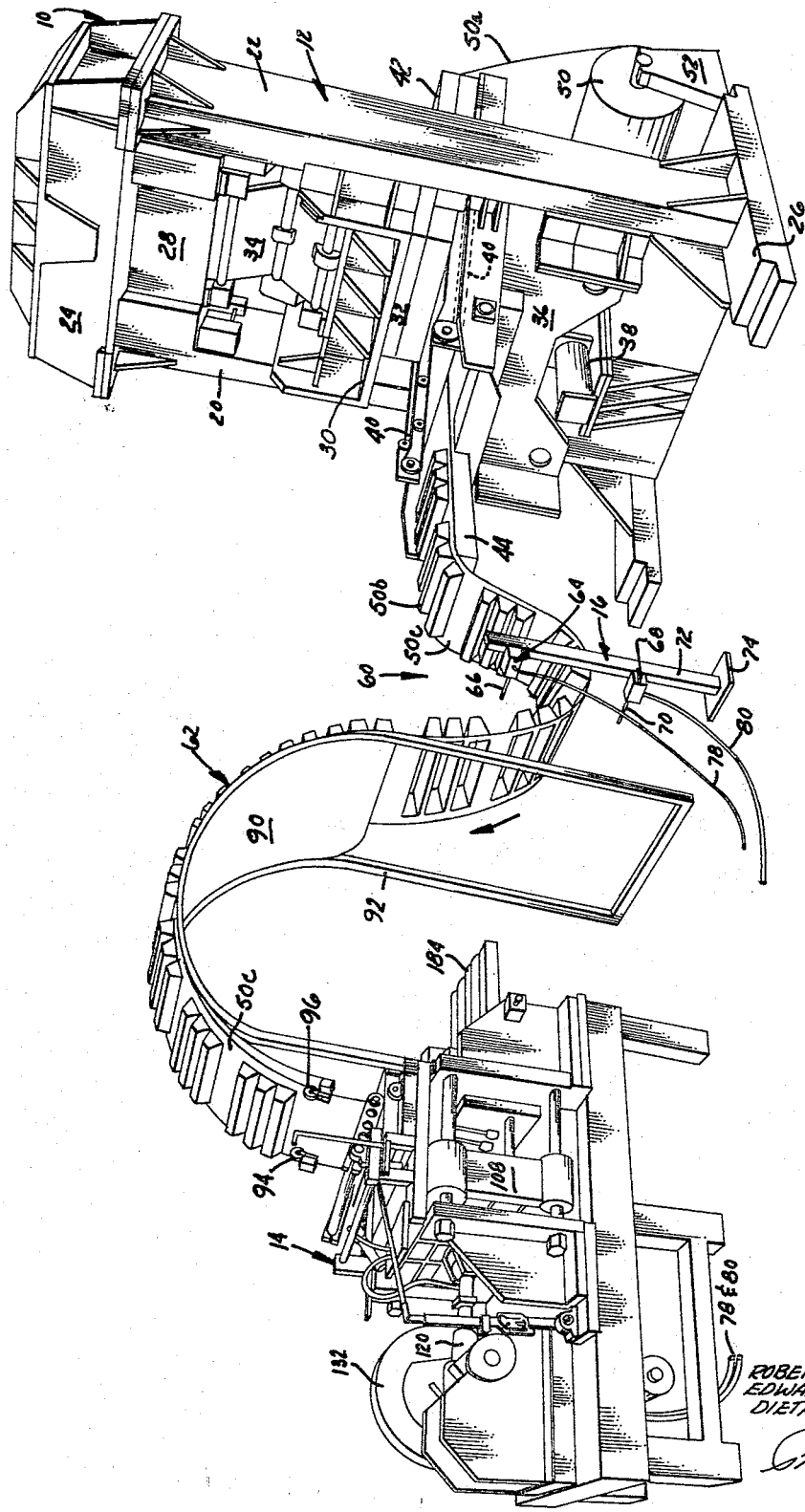
FIG. 1 is a perspective view of the complete forming, advancing, and trim equipment for forming and severing three dimensional articles from a generally continuous plastically deformable web.

Referring now specifically to the drawings, particularly FIG. 1, the complete apparatus 10 there shown includes a forming press assembly 12, a trim press assembly 14, and a web sensor assembly 16 between the presses.

The forming press assembly 12 includes a pair of spaced upright pillars 20 and 22 with a cross beam 24 between the top ends thereof, and a support base 26 beneath the bottom ends thereof. The head 28 of the press has suspended therefrom a vertically reciprocable upper ram 30 with an upper die 32 mounted to the bottom thereof. This is operated by a toggle linkage 34 which may be actuated as by pressure cylinder means (not shown).

The lower die mounted to the bed 36 of the press may be fixed and stationary, or alternatively, vertically reciprocable by a second toggle linkage (not shown in detail) operated by another fluid cylinder 38. The apparatus for this structure includes web advancing means such as the pair of chain elements 40 on opposite sides of the press, extending from and advanceable through the preheat oven 42 to the outlet of the press adjacent guide surface 44. Further details of the press may be seen in greater detail in copending application entitled Universal Forming Press, Ser. No. 474,132, filed July 22, 1965 and assigned to the assignee herein.

The dies can use physical pressure and/or pneumatic pressure differential to form the articles into the thermoplastic web. The thermoplastic web is fed to the forming press from a roll 50 of generally continuous length, and rotatably supported on suitable stand means 52 to allow the web to be continuously pulled off, fed into and through the preheat oven 42 of selected length, and then between the dies of the reciprocable press, as advanced by moving chains 40. These chains can be driven by a suitable motor in accordance with the principles set forth in copending application entitled Plastic Sheet Advancing Apparatus, Ser. No. 474,034, filed July 22, 1965 and assigned to the assignee herein. The preheat oven can be formed according to the teachings in copending application entitled Sheet Preheating and Forming Method and Apparatus, Ser. No. 474,035, filed July 22, 1965.

The plastic web 50a entering into forming press has formed into it a plurality of three dimensional articles 50b. These are integrally pressed into its surface by the forming dies in selected spaced patterns, each pattern containing a plurality of like articles, as illustrated in FIG. 1. The web has a space 50c of webbing portion between the patterns. This space may be because of a conditioning treatment such as cooling air being blown onto this web portion between the preheat oven 42 and the forming press dies to prevent distortion of the last article in the pattern, as explained more fully in copending application entitled Sheet Preheating and Forming Method and Apparatus, Ser. No. 474,035, filed July 22, 1965 and assigned to the assignee herein.

Figure 9:
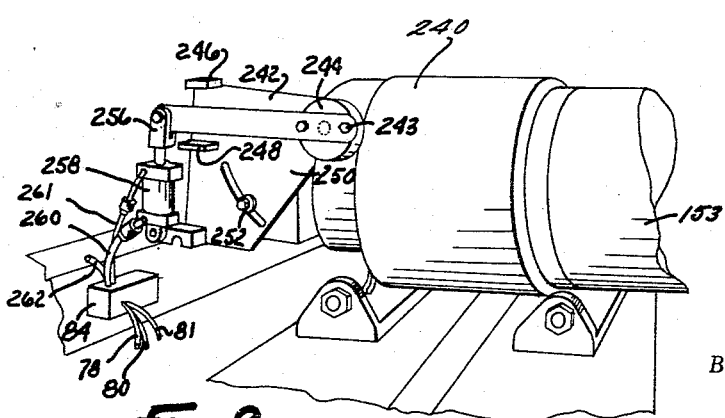
FIG. 9 is a perspective view of the variable speed power motor drive control means for the web advancing apparatus.

The web, with the articles formed into it but still intact, is conducted through a space 60 between the outlet side of the forming press and the arcuate guide 62 leading into the top of the trim press assembly 14. Positioned in this space is the sensing assembly 16 of the web control, including an upper electrical switch web sensor unit 64 having a sensor finger 66 extending out over the web, and a lower electrical switch sensor unit 68 having a sensor finger 70 extending out below the web. Both of these sensor units are mounted on a suitable support stand 72 with a base 74. Electrical leads 78 and 80 extend respectively from sensors 64 and 68. These extend to the control unit shown in FIG. 9, and specifically the solenoid valve assembly 84, as discussed more fully hereinafter.

The guide assembly 62 has a generally arcuate, up and over support surface. It may be formed of a metal sheet 90 mounted on a suitable support stand 92, or the equivalent such as conveyor rollers or the like. On the discharge, downwardly directed end of this guide is a pair of holding rollers 94 and 96 mounted to the support in positions to press the edges of the web 50e into downwardly directed relationship on its vertical path into the trim press.

This trim press, shown more specifically in FIG. 2 includes a fixed die plate 101 on support 100, and having an article passage opening 102 therein, as well as a sharp peripheral edge around the opening. This plate is mounted fixedly to the framework 104 of the press, to be cooperative with the trim die 106 attached to the reciprocable ram 108. This ram is mounted to reciprocate horizontally, by suspension on bearing sleeves 110 and 112 slidable on fixed guide rods 114 and 116. The ram 108 is reciprocated horizontally toward and away from die plate 100 by a crank 120 pivotally attached at 122 to the rear end of the ram, and mounted on a conventional offset throw bearing of the crank shaft 130. Its offset axis rotates about the shaft axis as is usual and as is illustrated by the axes shown at 121 and 123 in FIG. 6. The crank shaft is driven by a large fly wheel and pulley 132 which is rotated by V belts 134. These belts are driven by a variable speed electrical drive assembly 136 having a pulley 138 on its output shaft 137.

Mounted on the opposite end of crank shaft 130 from fly wheel 132 is web advancing means for the trim press, including a rotary cam 142 which makes one rotary revolution per each reciprocable revolution of the trim press. Abutting the periphery of this rotary cam is a cam follower wheel 144 rotatably mounted on the side of a vertically extending, arcuately rocking lever 146 that has two different pivot mounts. More specifically, the lower end of this lever is mounted to the pivotal journal 148 at lower pivot mount 150. Closer to the cam and cam follower, i.e. between this pivot mount 150 and cam follower 144 is a second upper pivot mount 152 intermediate the ends of the lever. The lever has upper and lower parts overlapping at pivot 152. The lever 146, when appropriately treated, can pivot about either of these pivot mounts to have a different length stroke on link 154. Normally, pivotal action of the lever with rotation of cam 142, occurs about lowermost pivot 150. The lever does not buckle at pivot 152, under its regular oscillation, since, even though there is some bending force applied by cam 142 that tends to cause bending about pivot 152, the backward force applied by link 154 at the upper end of the lever tends to counteract this and maintain the lever straight. The lever is made so that it can only buckle in one direction (clockwise as viewed in FIG. 2). This normal shifting of lever 146 causes its lever upper end to shift a predetermined distance in a slight arc, generally horizontally, to thereby shift link 154 a predetermined amount horizontally.

Figure 8:
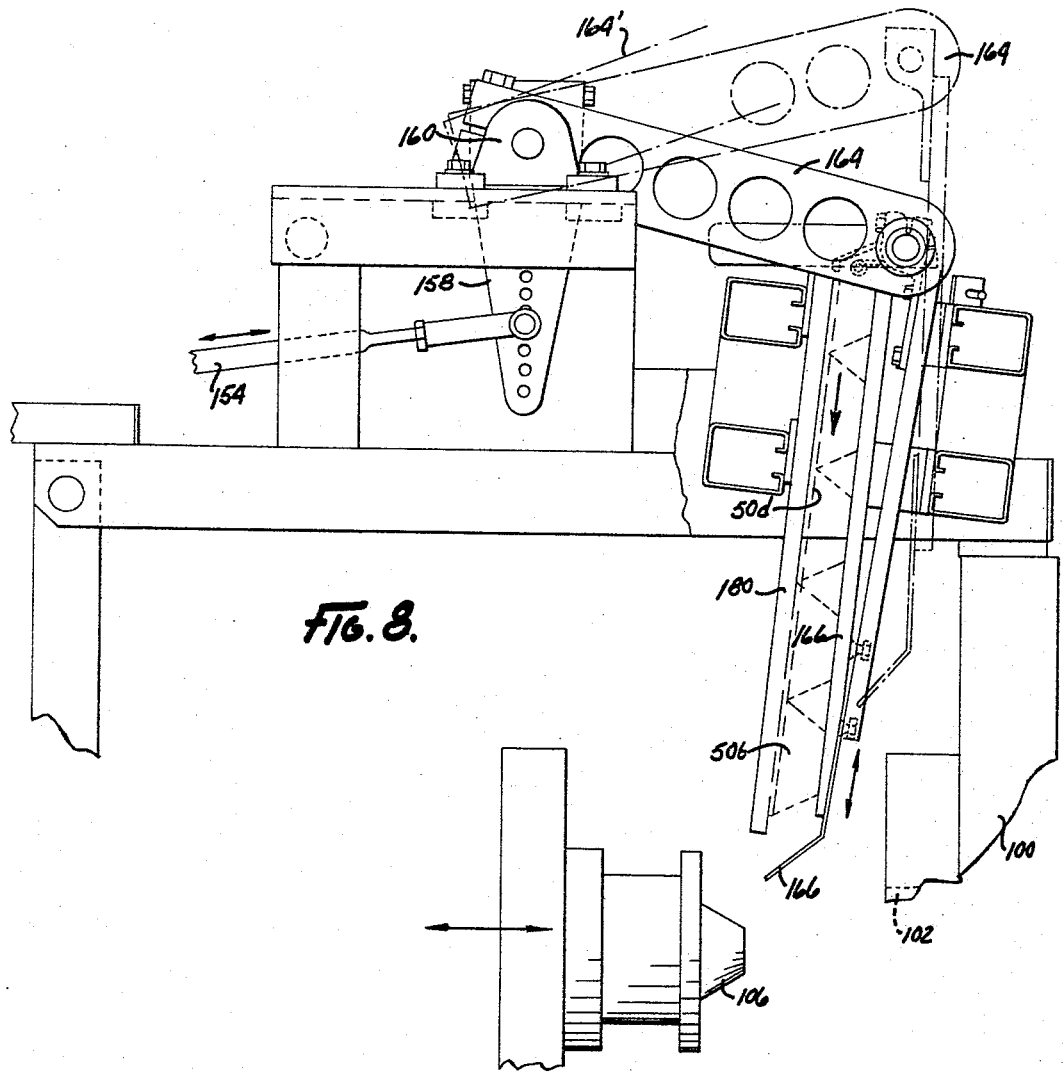
FIG. 8 is a side elevational, enlarged view of the trim press advancing apparatus.

One end of link 154 is pivotally connected to the upper end of lever 146, and the opposite end is pivotally connected to the downwardly depending rocking arm 158. A shaft 162, suspended in journal bearings 160, has a keyed connection to arm 158, and also is keyed to another cantilever type arm 164. To the outer end of arm 164 is suspended pushing means, specifically fingers 166. These pushing fingers, seen more specifically in FIG. 8, have a bent lower end to catch behind preformed articles 50b on web 50d, to push them downwardly as the arm reciprocates. These fingers straddle trim die 106 and die orifice 102 in plate 100 so as to not interfere with the die cutting operation. The fingers are pivotally mounted on their upper end to shift with the die and hold the article and web portion down until the web is gripped by pivotal holding elements 169 which also swing with die movement. Thus, as cam 142 (FIG. 2) rotates, lever 146 rocks back and forth on pivot 150 to shift link 154 back and forth, thereby rocking the depending arm 158 and tilting the cantilever arm 164 between its solid line position and its phantom line position illustrated in FIG. 8. This shifts the advancing pushing fingers 166 up and down between their solid line position and their phantom line position in FIG. 8, to thereby push one article down, and then back up while moving out and around the next article to catch in behind this next article. The web and articles are, therefore, pushed down the vertical guide 180 to place each article one at a time in front of die 106 so that, as the die reciprocates, the article is pushed into the die plate opening 102 and severed from the web. The articles are then collected on a suitable platform means 184 (FIG. 1) in horizontally stacked fashion or in suitable containers.

Because a definite space 50c exists between each pattern of a plurality of formed articles, the trim press advancing means must account for this. The advancing means normally advances the web with its integral articles an amount equal to the width of each article. In the web shown, the forming dies form three articles in each pattern of articles. Thus, the unit makes three normal strokes to advance the three articles in a pattern, one at a time. More specifically, the downward stroke of pusher fingers 166 occurs with backward movement of lever 146 to the position on the small radius portion of cam 142 as shown in FIG. 2. The weight of cantilever arm 164 causes this downward pushing, to advance the web the width of one article. As cam 142 continues to rotate, lever 146 and rod 154 are pushed toward the web, to hoist pusher fingers 166. Since the fingers are pivotally mounted on the upper end at 165 to the cantilevered end of arm 164, they move out and around the three dimensional configuration of the next article, to catch behind the next article and push it downwardly in the next stroke. This occurs once with each revolution of the cam, and thus once with each revolution of the reciprocable trim die 106. After three complete strokes of the trim die, and three shiftings of the web with lever 146 pivoting on its lowermost pivot 150 (FIG. 2), the fourth shift of this lever is of a different nature.

More specifically, lever 146 is caused on the fourth shift to pivot about its upper pivot mount 152 because of the contact of an abutment 200 (FIG. 4) with the back side of lever 146 opposite cam 142. This abutment moves one quarter of a turn on its shaft 202 with each revolution of cam 142. Thus, it moves through the four positions illustrated in FIG. 4, three of which are shown in phantom. Thus, during three of the pivotal strokes of lever 146, the lever cam pivot about its lower mount 150, without interference from abutment 200. At the fourth stroke, as cam 142 shifts from its small radius portions in contact with follower 144 to its large radius portions, the lever cannot shift about pivot 150 because of abutment 200. This forces it to pivot about upper pivot 152. Consequently, the movement of the upper end of the lever, and thus of link 154 attached thereto, is greater during this fourth stroke because of the leverage occurring with the closer location of pivot 152 to cam follower 144. This causes fingers 166 to shift the web and articles a greater amount than the normal stroke, and in fact, an amount preset to equal the width of one article plus the width of space 50d between the two patterns of articles. This is preset by vertically adjusting the length of lever 146 with bolts 210 in slots 212 (FIG. 4).

The controlled rotation of abutment 200 (FIG. 4) is achieved by the ratchet drive assembly shown in FIGS. 6 and 7. More specifically, mounted on crank shaft 130 is a radially projecting rotating cam 216 which rotates one revolution for each revolution of the crank shaft. This cam abuts and shifts a cam follower 218 once each revolution, to pivot it on its pivot shaft 220. This pivoting also causes arcuate movement of radial leg 222 keyed to shaft 220, to thereby hoist the forked end 224 of this shaft once each revolution. This fork end fits alternately within each of the four notches 226 on rotating ratchet wheel 228 keyed to shaft 202 that mounts the radially projecting abutment 200.

This shaft 202 is mounted rotatably in a pair of spaced bearing journals 232 and 234. Thus, each revolution of crank shaft 130 causes pivoting of arm 222 for shifting ratchet wheel 228 and thus shaft 202 90° to move abutment 202 through the four positions illustrated in FIG. 4. Consequently, every fourth revolution of the apparatus causes a large shift of the web and article to cause arm 164, for example, to move to the second phantom line position at 164' (FIG. 8), rather than the lower phantom line position.

Figure 10:
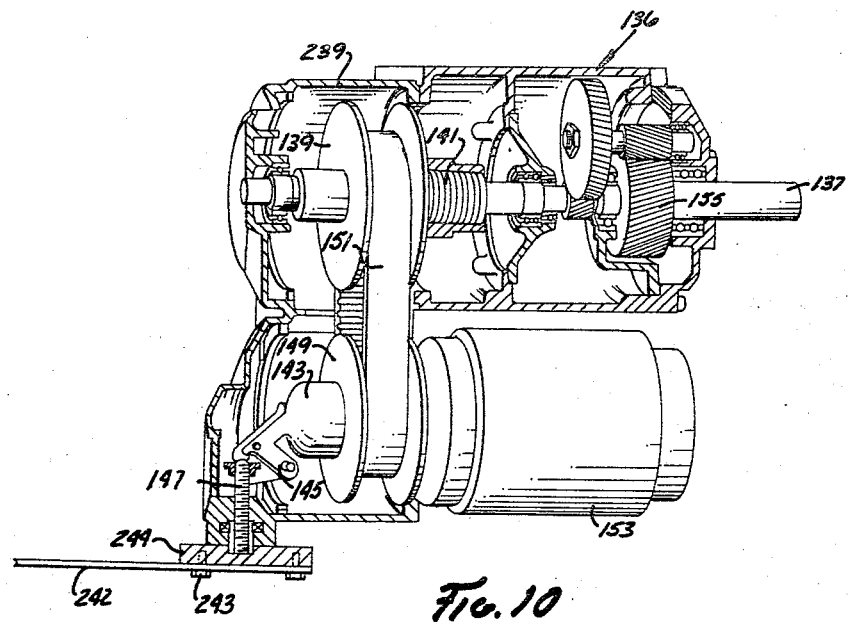
FIG. 10 is a cutaway perspective view of the variable speed drive means in FIG. 9.
Figure 3:
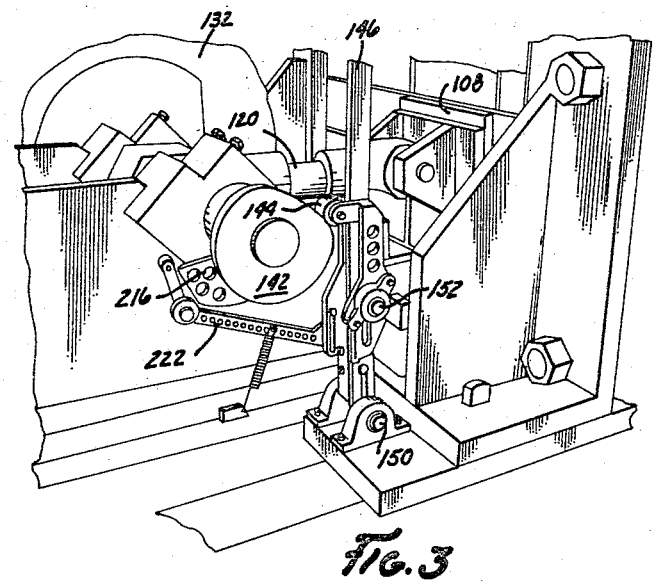
FIG. 3 is an enlarged fragmentary perspective view of a portion of the trim press in FIG. 1, particularly showing a portion of the web advancing means for the trim press.

All of these cam and crank mechanisms on the trim press are driven, therefore, from the belt and pulley assembly 138, 134 and 132. These are driven by a variable speed drive means 136 shown in FIGS. 2, 9 and 10. This variable speed drive means operates according to a well-known variable pulley principle. A first, variable diameter, expandable pulley 139 is biased together by coil spring 141. A second, spaced, expandable variable diameter pulley 149 is mechanically actuated by a hub 143 and a linkage 145 attached thereto and to a threaded rotatable stud 147. A wide drive belt 151 extends around the pulleys. Pulley 149 is driven by an electrical motor 153. Pulley 139 drives the output shaft 137 through speed reduction gears 155.

Variable regulation of the output of the assembly is achieved by rotation of stud 147 to change the size of pulley 149 in housing 240, and thereby force the corresponding change in pulley 139 in housing 239. In this assembly, a hub 244 is affixed to the end of stud 147. A radially extending lever 242 is attached to this hub by bolts 243. Lever 242 can shift in the range between an upper stop 246 and a lower stop 248. These stops are mounted on a fixed plate 250 which is initially angularly adjustable with bolt and slot connection 252. On the opposite end of lever 242 from hub 244 is a pivotal connection to the extended cylinder shaft 256 of fluid actuated cylinder 258. This fluid actuated cylinder is supplied by pressurized air or fluid through lines 260 and 261 from solenoid valve 84 that communicates through a line 262 to a pressurized supply (not shown). The solenoid valve, as stated previously, is controlled through electrical leads 78, 80 and 81 which connect this unit electrically to web sensor switch 64 and 68 (FIG. 1) and to a power supply. This entire assembly controls the speed of operation of the trim press in relation to the condition of the web between the two presses. If the web becomes excessively slack and contacts lower sensor finger 70 of electrical limit switch sensor 68, the switch is actuated to complete a circuit through solenoid vallve 84, shifting it in one direction to supply fluid to cylinder 258. The cylinder shifts lever 242, which varies the spacing of the pulleys, causing a change of the drive belt relationship to speed up the drive output to the several crank and cam drives for the trim press, with respect to the forming press. This causes the trim press to operate faster, thereby drawing the slack out of the web.

If, on the other hand, the web becomes too taut and contacts upper sensor finger 66 of electrical switch 64, this limit switch closes a circuit which shifts solenoid valve 84 in the opposite direction, to retract the cylinder, causing lever 242 to retract and slow down the drive relationship. Thus, the trim press operates more slowly and causes greater slack to occur in the web. The unit is thus automatically controlled to maintain a certain range of web slackness between the two presses.

It is conceivable that this control system could control the forming press speed rather than the speed of the trim press, but usually it is desirable to maintain a constant output from the forming press to prevent over heating or under heating of the web prior to forming.

With this apparatus, automatically controlled synchronization always occurs between the two presses, even though the forming press shifts the web an amount equal to a pattern of a plurality of articles (here three), plus the spacing 50c therebetween, and while the trim press only shifts the articles one at a time, except for the larger shift to encompass one article and the space therebetween as it moves between two patterns of articles.

Certain additional advantages may occur to those in the art upon studying the foregoing disclosure and description. It is also conceivable that certain minor variations in structure could be made within the concept presented. Hence, the invention is intended to be limited only by the scope of the appended claims and the reasonably equivalent structures to those defined therein.

We claim:

1. Apparatus for forming three dimensional articles into a generally continuous web in repeat spaced patterns, with a plurality of articles in each pattern, and then severing the articles from the web, comprising: a forming press and first web advancing means therefor, and power drive means for both; a trim press having a support frame, reciprocal trim die means on said frame, crank means operably connected with said trim die means for reciprocation thereof, and power drive means, second web advancing means for said trim press, and power drive means for both; one of said power drive means including variable speed drive means; a web slack receiving space between said presses; upper and lower web sensor means in said space; controller means operably responsive to said sensor means and operably connected with said variable speed drive means in a manner to vary the output thereof, and thereby maintain the web slack between said presses within a controlled range; said second web advancing means including rotating cam means, and reciprocable pusher means adjacent said die means to advance successive articles and surrounding web portions to said die means, lever means operably connected to said pusher means, operably engaged by said cam means, and having two spaced pivot mounts at different spacings from said cam means; said lever means normally shifting about one of said pivot mounts to advance said pusher means a predetermined normal amount; lever abutment means adapted to abut said lever between said mounts when activated; means operably associated with said pusher means to intermittently activate said abutment means after a repeat number of pusher strokes, causing said lever means to shift about said second pivot mount, thereby causing said pusher means to shift the web a predetermined amount over the spacing between article patterns in the web.

2. Apparauts for forming pluralities of articles in a plastic web in spaced patterns, each of a plurality of articles, and then severing the individual articles from the web, comprising: a forming press and first means to advance web therethrough; a trim press and second means to advance web and articles therethrough; said second advancing means including reciprocal means having a predetermined repeat stroke length for advancing the web an amount equal to the width of each article in a pattern, and means causing a periodic different stroke length to advance the web over the spacing between patterns and said trim press; variable speed drive means for said second advancing means; a web slack receiving space between said presses; upper and lower web sensor means in said space; controller means operably associated with said sensor means and with said variable speed drive means to maintain the web slack between said presses within a controlled range, even though the presses tend to advance the web at different rates.

3. Apparatus for repeatedly forming and severing three dimensional articles from a generally continuous plastic web material, comprising: a forming press and first web advancing means therefor, and power means for both; a trim press and second web advancing means therefor, and power means for both; variable speed drive means for one of said power means; a web slack receiving space between said presses; upper and lower web sensor means in said space; controller means operably associated with said sensor means and with said variable speed drive means to maintain the web slack between said presses within a controlled range.

4. Apparatus for forming and severing three dimensional articles from generally continuous plastic web material, comprising: a forming press having means for forming articles from a web, and having a web infeed side and a web discharge side; first web advancing means for intermittently advancing the web through said forming press; a trim press adjacent said web discharge side, including means to sever formed articles from the web, and having web input means and web guide means leading thereto; second web advancing means for intermittently advancing the web through said trim press; variable speed drive means for said trim press and second web advancing means; said web guide means and said forming press discharge side having a space therebetween to allow the web to drape down with slack; vertically spaced upper and lower web sensor means in said space, responsive to web contact and operably associated with said variable speed drive means to vary the drive speed of said second web advancing means and trim press in relation to the web slack in said space.

5. Apparatus for forming and severing articles from a generally continuous web, comprising: a reciprocating forming press, first web advancing means and power operating means for both; a trim press, second web advancing means and second power operating means for both; a web slack receiving space between said presses; one of said power means including variable speed drive means, and fluid cylinder actuating means therefor; electrically operable solenoid valve means operably associated with said actuating means to control it; upper and lower electrical switch web sensors in said web slack receiving space and electrically connected to said solenoid valve to controllably actuate it and cause the web slack in said space to be controlled within a range by causing variations in said variable speed drive means in response to said solenoid controlled actuating means as activated through said sensors.

6. Apparatus for regulating the feed of an article containing web from a first machine, having a first independent feeding means, to a second machine, having a second independent feeding means, comprising: web advancing means forming said second independent feeding means, and variable drive means to said web advancing means and to said second machine; upper and lower web sensor means spaced vertically of each other to sense web slack; and controller means operably associated with said sensor means and with said variable drive means to maintain the web slack within a controlled range by controlling said variable drive means with respect to sensing of the web by said sensor means.

References Cited
UNITED STATES PATENTS

| | | | |
|---|---|---|---|
| Re. 15,517 | 1/1923 | Mallory | 18—19 |
| 1,574,564 | 2/1926 | Farnsworth | 18—19 |
| 1,754,502 | 4/1930 | Denmie. | |
| 2,229,613 | 1/1941 | Strauch | 18—19 X |
| 3,027,596 | 4/1962 | Knowles | 18—19 |
| 3,222,971 | 12/1965 | Gertetz | 83—218 |
| 3,228,066 | 1/1966 | Rippstein | 18—19 |
| 3,238,691 | 3/1966 | Miller et al. | 53—51 X |
| 3,240,851 | 3/1966 | Scalora. | |

FOREIGN PATENTS 1,136,480  9/1962  Germany.

WILLIAM J. STEPHENSON, *Primary Examiner.*